United States Patent [19]

Albinger

[11] 4,029,911

[45] June 14, 1977

[54] ELECTRO-ACOUSTIC TRANSDUCER AND METHOD OF MANUFACTURING SUCH A TRANSDUCER

[75] Inventor: Walter Albinger, Vienna, Austria

[73] Assignee: U.S. Philips Corporation, New York, N.Y.

[22] Filed: Apr. 28, 1976

[21] Appl. No.: 680,904

[30] Foreign Application Priority Data

Apr. 29, 1975 Austria .............................. 3300/75

[52] U.S. Cl. .......................... 179/115.5 ES; 29/594; 179/115.5 VC

[51] Int. Cl.² .................. H04R 7/18; H04R 9/04; H04R 31/00

[58] Field of Search ............... 29/594; 179/115.5 R, 179/115.5 ES, 115.5 VC, 181 R; 181/171, 172

Primary Examiner—George G. Stellar
Attorney, Agent, or Firm—Frank R. Trifari; David R. Treacy

[57] ABSTRACT

An electro-acoustic transducer having a chassis with a plastic contact surface for attachment of a vibratory diaphragm. The diaphragm is attached by an ultrasonic weld between the contact surface on the chassis and the edge of the vibratory part.

6 Claims, 2 Drawing Figures

ELECTRO-ACOUSTIC TRANSDUCER AND METHOD OF MANUFACTURING SUCH A TRANSDUCER

BACKGROUND OF THE INVENTION

1. FIELD OF THE INVENTION

The invention relates to an electro-acoustic transducer having a chassis, with at least one contact surface for the attachment of the edge of a vibratory part of the transducer, for example a loudspeaker cone or a centering ring, and hereinafter redferred to as a diaphragm, at least the contact surface on the chassis consisting of a plastic.

2. DESCRIPTION OF THE PRIOR ART

2. In known transducers of this type the edge of a vibratory diaphragm of the transducer is generally attached to the contact surface on the chassis by means of an adhesive. Care must then be taken that the adhesive is uniformly distributed over the contact surface, so as to ensure that along the entire edge the diaphragm is firmly connected to the contact surface, without the adhesive emerging sideways from underneath the edge to the vibratory part of the vibratory part of the diaphragm.

A further problem associated with such a glued connection is that a certain time is required for the adhesive to harden an thus for the connection to become solid. During the time, required for the adhesive connection to harden the diaphragm must not be moved out of the position in which it has been placed, because otherwise correct operation of the transducer will be unlikely or its acoustic properties are adversely affected. In particular in the case of mass production of loudspeakers it is difficult to meet this the requirement of short method cycle time and high quality.

SUMMARY OF THE INVENTION

It is an object of the invention to provide a particularly reliable, fast and simple attachment of the edge of a diaphragm of an electro-acoustic transducer.

According to the invention a concentrated ultrasonic weld is formed between a plastic contact surface on the chassis and the edge of the diaphragm of the transducer. It has been found that with an ultrasonic weld a particularly uniform, reliable and rapid attachment of the edge of the vibratory part of the transducer to the plastic contact surface on the chassis can be obtained, because the ultrasonic weld becomes rigid immediately, so that production becomes particularly simple and good acoustic properties of the transducer are obtained.

In a preferred embodiment of the invention the area of the contact surface for the edge of a diaphragm is radially greater than the area of the surface which is covered by the weld, the edge of the diaphragm freely engaging along a contact surface with the part extending radially inwardly from and adjoining the weld. Thus it is ensured that the part of the edge of the diaphragm which adjoins the vibratory part of the diaphragm uniformly bears on the contact surface of the chassis, this engagement being of particular importance for an acoustic diaphragm.

The invention furthermore relates to a method of manufacturing an electro-acoustic transducer, in which a magnet system with a central core is first provided with a chassis, on which a contact surface for the edge of a diaphragm has been formed, at least said contact surface consisting of a plastic, after which a diaphragm having a moving coil thereto is mounted on this assembly, and edge which is to engage with the contact surface on the chassis is then attached to the contact surface. In the method according to the invention after placing the diaphragm onto the assembly of chassis and magnet a bell-shaped ultrasonic generator is moved into position aligned with the side of the diaphragm and the generator's free end which constitutes the radiating surface is pressed onto the edge of the diaphragm, the edge then being welded to the contact surface on the chassis. Thus, a rapid production process is obtained, in addition to high uniformity of the acoustic properties of the transducer.

With such a method it has been found to be advantageous if before the application of the ultrasonic generator, the assembly is first positioned relative to the ultrasonic generator by means of positioning elements, such as centering pins and sockets, on the ultrasonic generator and on the core of the magent system, and subsequently the diaphragm to which a hollow moving coil is attached is centered relative to the ultrasonic generator and the assembly by the engagement of a hollow cylindrical projection, which is diposed on the ultrasonic generator and is coaxial with the positioning element on the ultrasonic generator, with the open hollow moving coil. Thus, an accurately defined position of the moving coil in the air gap of the magnet system can be obtained. The position of the moving coil will not change when it is released by the centering unit, because the ultrasonic weld between the edge of the diaphragm and the contact surface on the chassis solidifies immediately.

According to a different aspect of the invention, a method of manufacturing an electro-acoustic transducer having a magnet system with a central coil involves use of a chassis having one contact surface for the edge of a diaphragm cone and another for a diaphragm type centering ring, at least said contact surfaces consisting of a plastic. The chassis assembly is combined with the vibratory parts of the transducer, i.e. a diaphragm cone, a centering ring and a moving coil, the edges of the cone and of the centering ring being attached to the respective contact surfaces on the chassis. The centering ring which is connected to the moving coil is placed on the assembly so that its edge is disposed on the associated contact surface on the chassis, after which a bell-shaped ultrasonic generator is brought into position and is pressed onto the edge of the centering ring with its free end which constitutes the radiating surface, thereby welding the edge of the diaphragm ring to the contact surface on the chassis. Subsequently the cone diaphragm is placed on the centering ring and is connected thereto, the cone edge being thereby positioned on its associated contact surface on the chassis, after which a second bell-shaped ultrasonic generator is brought into position and is pressed onto the edge of the diaphragm cone with its free end which constitutes the radiating surface, the edge thus being welded to the contact surface on the chassis. This alternative method takes more time compared with the method described hereinbefore, but it assures a particularly reliable connection with the contact surface on the chassis which is associated with the relevant edge, both for the edge of the cone diaphragm and for the edge of the centering ring diaphragm.

With such a method it has also been found to be advantageous if the assembly of centering ring and coil is first positioned relative to the ultrasonic generator by means of positioning elements such as the aforementioned pin and sockets located respectively on the ultrasonic generator and on the core of the magnet system, and subsequently the centering ring and the moving coil are centered relative to the ultrasonic generator and the assembly by the engagement of a hollow cylindrical projection disposed on the ultrasonic generator and coaxial with the positioning element on the ultrasonic generator, with the open hollow moving coil which is connected to the centering ring. Thus, again an accurately defined position of the moving coil in the airgap of the magnet system is obtained, which is no longer subject to changes owing to the immediately solidified ultrasonic weld.

BRIEF DESCRIPTION OF THE DRAWING

The invention will be described in more detail with reference to the drawing in which two embodiments of the invention are shown to which it is not limited.

DESCRIPTION OF THE PREFERRED EMBODIMENTS

Figure 1:
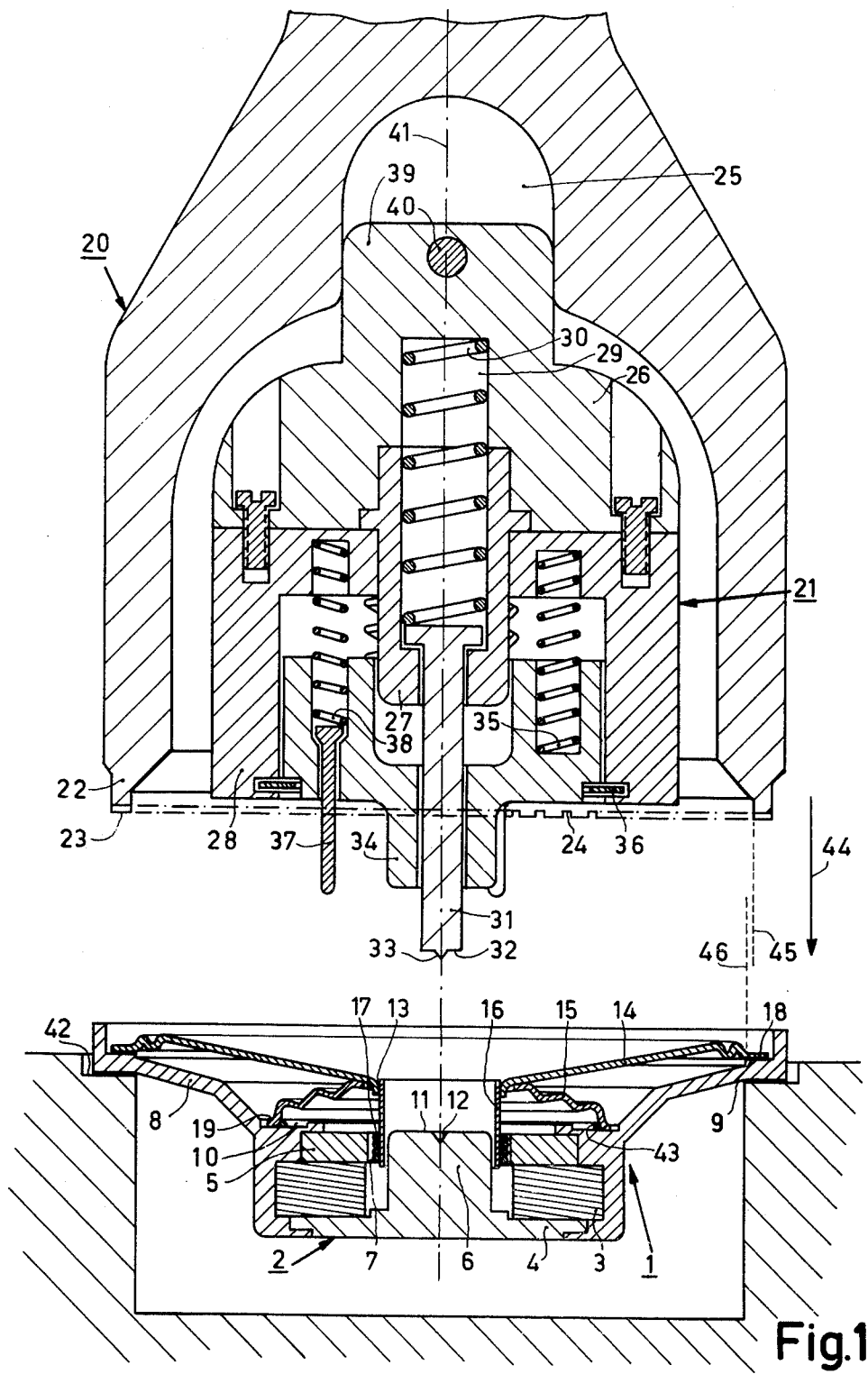
FIG. 1 is a cross-sectional view of an electro-acoustic transducer having a cone diaphragm positioned on a contact surface of the chassis, and above it an apparatus for forming the ultrasonic weld between the edge of the cone, diaphragm and the contact surface on the chassis.

FIG. 1 shows an electro-acoustic transducer 1, in the present instance a loudspeaker, having a magnet system 2 comprising a permanent magnet ring 3, a bottom plate 4 and a cover plate 5. The bottom plate 4 carries a magnet core 6, which projects into a bore 7 formed in the cover plate 5, so that an air gap is formed. In order to retain the individual parts 3, 4 and 5 of the magnet system, a plastic is molded around them, a plastic 8 being formed at the same time, which at its inside comprises two contact surfaces 9 and 10, which consequently also consist of a plastic. Thus, the parts 3, 4, 5 and 8 constitute an assembly. Furthermore, a centering socket 12, which takes the form of a conical hole, is formed in the outer surface 11 of the magent core 6 — which is suitably concentric relative to the air gap of the magnet system — so that the socket forms one of two positioning elements whose significance will be further explained hereinafter.

The vibrating parts of the electro-acoustic transducer comprise a vibratory cone diaphragm 14 with an opening 13, a centering ring diaphragm 15 and a base 16 for a moving coil 17, which are conventionally connected to each other, for example by guiding the moving coil into place with its base being mounted in the opening 13 of the cone in such a way that the interior of the coil forms an open space. The cone has an edge 18 and the centering ring has an edge 19, which serve for connection to the contact surfaces 9 and 10 on the chassis 8. Of course, the moving coil 17 may also be air-spaced and connected directly to the cone 14. Similarly, the centering ring may take the form of a so-called spider which comprises arms whose free ends are provided with edge zones which in their turn are used for attaching the spider to the relevant contact surface on the chassis. In itself, it is of course also possible to completely dispense with a centering ring. The cone or the centering ring diaphragms may be made of any materials which are currently used for this purpose, such as paper, plastics, or fabrics.

FIG. 1 furthermore shows the radiating part of an ultrasonic generator 20, which is bell-shaped and has inside it a centering unit 21 which points in the direction of the opening of the bell, arranged vibration-free. The parts required for the generation of ultrasonic waves are not shown, because they are irrelevant for the invention. At the free end 22 of the bell-shaped generator a radiating surface 23 is formed, which has grooves 24 which extend radially towards the axis of the bell, so that a series of concentrated ultrasonic field segments of an annular strip produced. This configuration produces particularly solid welds. In the bell-shaped interior of the generator a bore 25 is formed, which guides the centering unit.

The centering unit itself comprises a base 26 on which two guide members 27 and 28 are arranged. Between the base 26 and the guide member 27 a space 29 is formed, in which a spring 30 is mounted. This spring 30 biases a mandrel 31 outward, the mandrel being slidable and retained by the guide member 27. At the free end of the mandrel 31 on a transverse face 32 a conical axial point 33 is formed, which again forms one of two positioning elements, whose significance will be described in more detail hereinafter. Coaxial with the mandrel 31 and axially slidable thereon is a hollow cylindrical projection 34, which is also guided by corresponding surfaces of the guide members 27 and 28. Three springs 35 which are spaced 120° from each other are located between the guide member 28 and the projection 34, which springs biasing the projection 34 axially into engagement with a retaining ring 36 which is disposed in a groove in the guide member 28. In the projection 34 three pins 37 which are spaced 120° from each other at a diameter which is greater than that of the projection 34 are mounted and retained so as to be movable longitudinally against the action of springs 35 which bear against the guide member 28. On the base 26 another projection 39 is formed which fits the bore 25 of the ultrasonic generator, in which it is retained with a pin 40 which passed through the projection and the ultrasonic generator at a vibration node. Thus, the centering unit is mounted vibration-free inside the bell-shaped ultrasonic generator, and its mandrel 31 as well as the projection 34 and the pin 37 are movable in the direction of the axis 41 of the bell, the mandrel 31 protruding from the projection 34 in the rest position of the generator.

For mounting the electro-acoustic transducer elements first the assembly consisting of the magnet system 2 and the chassis 8 is placed on a recessed mounting surface 42 with an annular contact surface which is formed at the outside of the chassis 8 resting on the surface 42, and the chassis and magnet system being able to move freely parallel to the surface in the recess. Subsequently, the contact surface 10 on the chassis 8 is provided with an adhesive 43, after which the cone 14 which is already assembled with the centering ring 15 and the moving coil 17 is placed on the chassis assembly. The edge 18 of the cone is positioned on the contact surface 9 on the chassis, with the edge 19 of the centering ring 15 resting on the contact surface 10 on the chassis and the adhesive on them, and the moving coil 17 located in the air gap of the magnet system. As the adhesive will always requires a certain time to harden, at this stage of completion the moving parts of the transducer can still be moved relative to the chassis assembly.

Subsequently, the ultrasonic generator 20 is moved from a position axially to one side of the diaphragm in the direction of the arrow 44, the point 33 formed at the free end of the mandrel 31 first engaging with the centering socket 12 in the magnet core, so that the chassis assembly is moved radially as required and becomes properly positioned relative to the ultrasonic generator. The point 33 and the centering socket 12 thus function as positioning elements in a similar way as a pin-hole connection, the assembly being moved, if necessary, on the mounting surface 42 into the correct position relative to the ultrasonic generator upon engagement of the point with the centering hole. It is evident that the point could equally well be formed on the magnet core and the centering hole in the mandrel. As the ultrasonic generator is further moved in position, the pins 37 contact the cone 14 and exert a light pressure on it, so that its edge 18 and the edge 19 of the centering ring 15 are kept in engagement with the respective contact surfaces 9 and 10 in the chassis. Subsequently, the projection 34 of the centering unit engages and enters the open, hollow base 16 of the moving coil 17, so that the vibratory parts of the transducer are now centered relative to the ultrasonic generator and thus relative to the magnet system as a result the moving coil assumes the correct position in the air gap of the magnet system. This step is performed while the adhesive 43 is still so soft that the edge 19 of the centering ring 15 can follow this movement.

As the ultrasonic generator is further moved axially into position its radiating surface 23 finally presses onto the edge 18 of the cone diaphragm 14, an ultrasonic weld being formed between said edge 18 and the plastic contact surface 9 because of the power applied to the ultrasonic generator, after which the power to the generator is cut off. As such an ultrasonic weld solidifies very rapidly, the generator can almost immediately be moved away from the cone, the pins 37 exerting such a pressure on the cone that the projection 34 of the centering unit can readily be withdrawn from the base 16 of the moving coil 17. As the position of the vibratory parts of the transducer is fixed by the solidified connection between the edge 18 of the diaphragm and the contact surface 9 on the chassis, this method does not require a time limit to allow hardening of the adhesive 43 so as to fix the edge 19 of the centering ring to the contact surface 10 of the chassis, because the position of the vibratory parts of the transducer can no longer shift while the adhesive is hardening.

It has been found that such a method rapidly yields a particularly uniform and solid connection of the edge of the diaphragm with the contact surface on the chassis, which good connection has a very favorable effect on the acoustic properties of the transducer.

Preferably, the area of the contact surface 9 for the edge 18 of the diaphragm is larger than the area of the surface covered by the weld, and the edge of the diaphragm is freely positioned on the contact surface 9 with a part of the diaphragm which is remote from its outer end and which adjoins the weld extending radially inward, this radial extension being indicated by the dotted lines 45 and 46 in FIG. 1. This ensures that an inwardly extending part of the edge 18 which faces the diaphragm is not covered by the ultrasonic weld and thus engages with the contact surface 9 freely, that is, in an unimpeded manner. This free engagement is of special significance to obtain good acoustic properties of the transducer.

The grooves 24 formed in the radiating surface 23 of the ultrasonic generator produce a strip-shaped concentrated ultrasonic weld, which is particularly reliable. It is evident that a locally successive concentration of the ultrasonic weld can also be obtained by a different shape of the radiating surface, for example by making the surface 23 corrugated or providing an annular ridge.

Figure 2:
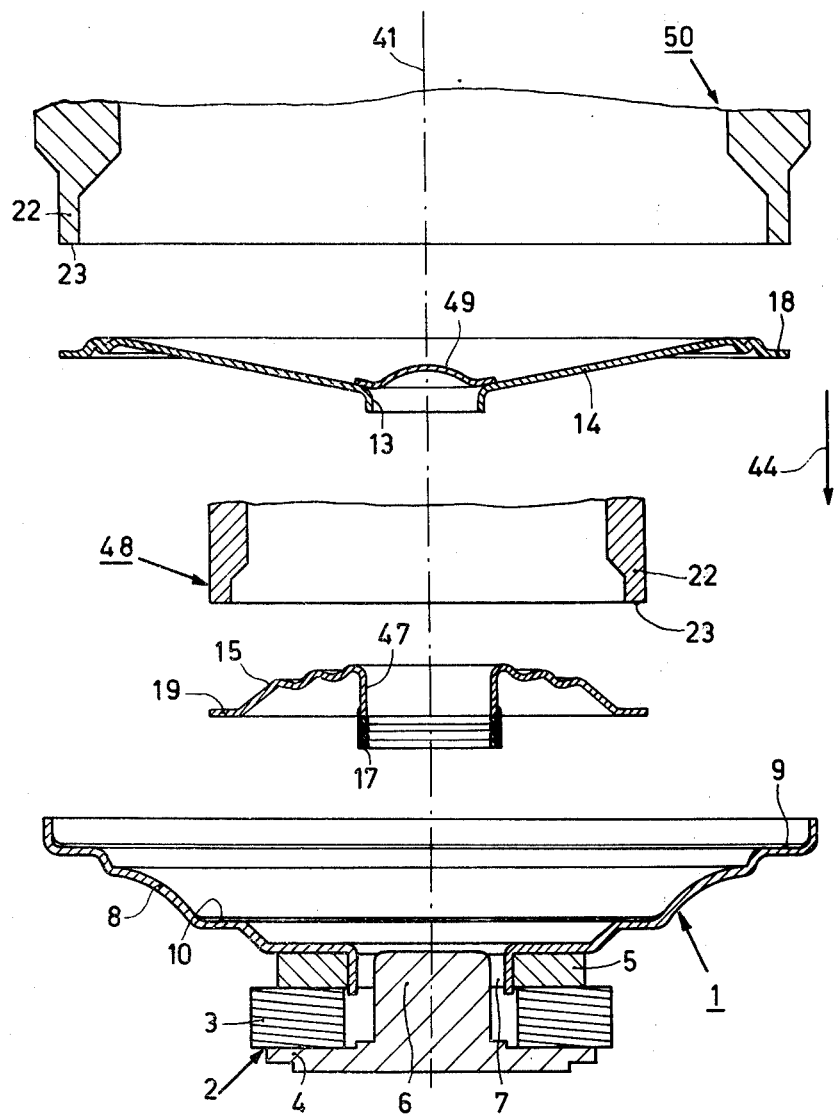
FIG. 2 is a schematic exploded view showing the individual steps of a method in which both the edge of a centering ring diaphragm and the edge of a cone diaphragm are attached to the corresponding contact surfaces on the chassis of an electro-acoustic transducer by means of an ultrasonic weld.

In the example of FIG. 2 the starting point is the subassembly which again comprises a magnet system 2 and a chassis 8, the chassis in this instance being a metal part which is pressed into the bore 7 of the coverplate 5. The chassis 8 is provided with contact surfaces 9 and 10 for the edge 18 of a cone 14 and the edge 19 of a centering ring 15, which surfaces consist of a plastic film, for example polyvinyl acetate, applied to corresponding areas of the metal chassis. Thus, the contact surfaces are again suitable for the formation of an ultrasonic weld with the respective edges of diaphragms, in the present example these including also the edge of the centering ring.

During a first stage of assembly of the electro-acoustic transducer the centering ring 15, which is connected to the moving coil 17 and which has an opening 47 at the location of said coil, is placed on the assembly, the ring edge 19 engaging with the plastic film which constitutes the contact surface 10. Subsequently, a first bell-shaped ultrasonic generator 48 is moved from a position to one side of the centering ring in the direction of the arrow 44 and the free end 22 which forms the radiating surface 23 is pressed onto the edge 19 of the centering ring 15, the edge then being welded to the contact surface 10 on the chassis 8.

After the removal of this first ultrasonic generator 48 the position of the centering ring 15 and the moving coil 17 relative to the magnet system 2 remains fixed because of the aforementioned nearly immediate hardening of ultrasonic welds. Subsequently, the diaphragm cone 14, whose central opening 13 may in this embodiment be covered with a dust cap 49, is placed on the centering ring and is for example connected thereto by gluing. The edge 18 of the cone 14 is then positioned on the plastic film which constitutes the contact surface 9 on the chassis. Subsequently, a second bell-shaped ultrasonic generator 50 is moved towards the assembly in the direction of the arrow 44 and the free end which constitutes the radiating surface 23 is pressed onto the edge 18 of the cone 14 the edge then being welded to the contact surface 9 on the chassis 8.

The first ultrasonic generator 48 may also take a form which is analogous to the ultrasonic generator 20 used in the example of FIG. 1, in that it is provided with a corresponding centering unit, so that again the position of the chassis assembly relative to the ultrasonic generator and the position of the centering ring and the moving coil relative to the generator and thus relative to the chassis and magnet assembly, is fixed in a simple manner. In the second ultrasonic generator 50 such a centering unit is not required, because the diaphragm assumes the correct position when it is fitted on the centering ring.

It is evident that several modifications to the embodiments described hereinbefore are possible without departing from the scope of the invention. In this respect it is to be noted that it is obvious that the steps in accordance with the invention may also be used with diaphragms with rims of the most different shapes, such as elliptical or those altogether irregular, in which case merely the radiating surface of the ultrasonic generator should be adapted to these shapes.

What is claimed is:

1. An electro-acoustic tranducer comprising a chassis having a contact surface, and a vibratory diaphragm having an edge, wherein said contact surface is formed of a plastic material, and said vibratory diaphragm is attached to the contact surface by an ultrasonic weld.

2. A transducer as claimed in claim 1 wherein said weld is a segmented series of weld strips.

3. A transducer as claimed in claim 1 wherein said contact surface and said edge each has an area greater than the area covered by the weld, so arranged that a portion of the diaphragm edge extending radially inward from the weld freely engages a portion of the contact surface adjacent the weld.

4. A method of manufacturing an electro-magnetic transducer having a chassis with a contact surface, and a vibratory diaphragm with an edge attached to the chassis, at least the contact surface consisting of a plastic material, comprising the steps of:

placing a diaphragm onto a chassis with the diaphragm edge against a plastic contact surface of the chassis, and pressing the radiating surface of an ultrasonic generator against the edge of the diaphragm so as to weld the edge to the plastic.

5. A method as claimed in claim 4, for attaching a diaphragm to a transducer chassis having a magnet system with a central core adapted for use with a moving coil diaphragm having a central hole adapted to fit over said core, comprising the steps of:

coaxially positioning an assembly of said chassis having a central core with respect to said generator, then aligning an assembly of the moving coil and diaphragm with respect to the generator by engaging said central with a cylindrical projection on the generator, prior to said pressing step.

6. A method as claimed in claim 4, wherein said moving coil diaphragm is an assembly of a moving coil and a centering ring, and said chassis has a plastic second contact area adapted for attachment of a second diaphragm, comprising in addition the subsequent steps of:

placing a second diaphragm on the moving coil diaphragm and centering the second diaphragm with respect to the moving coil diaphragm, gluing the second diaphragm to the moving coil diaphragm, and pressing the radiating surface of a second ultrasonic generator against the edge of the second diaphragm to weld the edge to the second contact surface.

* * * * *